United States Patent [19]

Wagensommer et al.

[11] 3,725,364

[45] Apr. 3, 1973

[54] PROCESS FOR PREPARING ELASTOMERS OF ETHYLENE AND $C_3$-$C_{10}$ ALPHA OLEFINS

[75] Inventors: Joseph Wagensommer, Westfield; Richard J. Lauria, Metuchen; John H. Staib, Plainfield, all of N.J.

[73] Assignee: Esso Research and Engineering Company, Linden, N.J.

[22] Filed: Sept. 10, 1971

[21] Appl. No.: 179,546

Related U.S. Application Data

[63] Continuation-in-part of Ser. No. 31,871, May 4, 1970, abandoned, which is a continuation-in-part of Ser. No. 667,051, Sept. 7, 1967, abandoned, which is a continuation-in-part of Ser. No. 613,727, Feb. 3, 1967, abandoned, which is a continuation-in-part of Ser. No. 504,120, Oct. 23, 1965, abandoned, which is a continuation-in-part of Ser. No. 464,862, June 17, 1965, abandoned.

[52] U.S. Cl. ........260/80.78, 260/88.2 R, 252/429 C
[51] Int. Cl. .........................C08f 15/40, C08f 15/04
[58] Field of Search........260/88.2 R, 80.78; 252/429

[56] References Cited

UNITED STATES PATENTS 3,567,653   3/1971   Wagensommer.....................252/429

Primary Examiner—James A. Seidleck
Assistant Examiner—Roger S. Benjamin
Attorney—Leon Chasan

[57] ABSTRACT

A process for polymerizing ethylene and higher alpha olefins in the presence of a catalyst comprising an alkyl aluminum and the reaction product of a vanadium oxyhalide and an alkyl titanate. The resulting elastomeric polymers have exceptional tensile strength and green strength.

7 Claims, No Drawings 3,725,364

PROCESS FOR PREPARING ELASTOMERS OF ETHYLENE AND $C_3$-$C_{10}$ ALPHA OLEFINS

CROSS REFERENCES

This application is a continuation-in-part of Ser. No. 31,871, filed May 4, 1970 and now abandoned which is a continuation-in-part of Ser. No. 667,051, filed Sept. 7, 1967 and now abandoned which is a continuation-in-part of Ser. No. 613,727, filed Feb. 3, 1967 and now abandoned which is a continuation-in-part of Ser. No. 504,120, filed Oct. 23, 1965 and now abandoned, which in turn is a continuation-in-part of Ser. No. 464,862, filed June 17, 1965 and now abandoned.

BACKGROUND OF THE INVENTION

1. Field of the Invention

This invention relates to a process for polymerizing ethylene and higher alpha olefins, preferably with a nonconjugated diene. More particularly, the invention relates to a novel catalyst used in the process comprising an alkyl aluminum and the reaction product of a vanadium oxyhalide and an alkyl titanate.

2. Description of the Prior Art

It is well known that ethylene and higher alpha olefins, such as propylene can be copolymerized at low pressures with a catalyst composed of a vanadium compound in conjunction with an alkyl aluminum compound.

The problem being solved by the polymers of the present invention are related to production of a curable essentially elastomeric compound which can be extruded to form hoses and tubes which will retain their extruded configuration prior to curing. This ability is commonly known as "green s strength," which is more completely defined hereinafter.

SUMMARY OF THE INVENTION

It has now been found that elastomeric polymers of ethylene and higher alpha olefins, preferably containing a non-conjugated diene polymerized therewith, may be produced by a process for polymerizing a mixture of ethylene and a $C_3$ to $C_{10}$ alpha olefin comprising contacting said mixture with a catalyst composition comprising: (a) an essentially one molar equivalent of an aluminum alkyl compound of the formula $R_mAlX_n$ wherein R is independently selected from the group consisting of $C_1$-$C_{12}$ monovalent hydrocarbon radicals, X is a halogen having an atomic number equal to or greater than 17, $m$ is an integer from 1 to 3 and the sum of $m$ and $n$ is equal to 3; in combination with (b) 0.05 to 0.8 molar equivalents of a polymerization catalyst component consisting essentially of the reaction product formed by mixing: (i) a vanadium oxyhalide wherein the halogen has an atomic number equal to or greater than 17; with (ii) a titanium compound having the formula $Ti(OR)_4$ wherein R is a $C_1$-$C_{12}$ alkyl radical and the mole ratio of said vanadium oxyhalide to said titanium compound is in the range of 0.05 to 10 moles of vanadium oxyhalide per mole of titanium compound.

The polymerizable mixture of monomers preferably contains a nonconjugated olefin in sufficient quantity to produce an interpolymer having from 0.1 to 20 weight percent, based on the interpolymer, of the nonconjugated diene present therein. It is preferred that the interpolymer contain 30 to 90 weight percent, based on the interpolymer, of ethylene. The most preferred mixutre of monomer comprises ethylene, propylene and 5-ethylidene-2-norbornene.

DETAILED DESCRIPTION WITH PREFERRED EMBODIMENTS

The vanadium compound which is used in this invention is a vanadium oxyhalide. The vanadium oxyhalide has the formula $VOX_3$ wherein X is a halogen having an atomic number equal to or greater than 17, i.e., chlorine, bromine, or iodine. The preferred vanadium oxyhalide is $VOCl_3$.

It is to be noted that vanadium tetrahalides such as $VCl_4$, which are frequently used as a catalyst component for the copolymerization of alpha olefins, have no use in this invention.

The titanium compounds of this invention have the general formula $Ti(OR)_4$ where R is a $C_1$-$C_{12}$ alkyl radical. Preferably, R is a $C_2$-$C_6$ alkyl radical. Thus, R may be an ethyl, propyl, butyl, pentyl, isopentyl, octyl, or hexyl groups. Most preferably, R is a butyl group so that tetrabutyl titanate is the most preferred titanium compound.

The alkyl aluminum compound which is useful in this invention has the formula $R_mAlX_n$ wherein R is a $C_1$-$C_{12}$ monovalent hydrocarbon radical, X is a halogen having an atomic number equal to or greater than 17 (i.e., Cl, Br, or I) or a $C_1$-$C_{12}$ monovalent hydrocarbon radical, m is an integer between 1 and 3 inclusive, and the sum of $m$ plus $n$ is equal to 3.

Specific examples of R and/or X groups include methyl, ethyl, propyl, n-butyl, n-amyl, isoamyl, phenyl, tolyl, and cyclopentyl radicals. Preferred are the $C_1$-$C_5$ alkyl groups such as ethyl and butyl groups. Most preferred is ethyl. The preferred halogen is chlorine.

Examples of suitable alkyl aluminum compounds include triethyl aluminum, tripropyl aluminum, triisobutyl aluminum, diethyl aluminum chloride, ethyl aluminum dichloride, and aluminum sesquichloride. Most preferred is diethyl aluminum chloride. Mixtures of alkyl aluminum compounds can also be suitably used.

About 0.05 to 10 moles, preferably 0.15 to 3.0 moles of vanadium compound are reacted per mole of titanium compound; and about 0.05 to 1.0 mole, preferably 0.10 to 0.80 mole of the reaction product is utilized per mole of aluminum alkyl compound.

The catalyst of this invention is used to copolymerize ethylene and a $C_3$-$C_{10}$ alpha olefin. The $C_3$-$C_{10}$ alpha olefin may be linear or branched where the branching occurs three or more carbon atoms from the double bond, and, while a single olefin is preferable, mixtures of these $C_3$-$C_{10}$ olefins may be employed. Suitable examples of $C_3$-$C_{10}$ alpha olefins include: propylene, 1-butene, 1-pentene, 1-hexene, 1-heptene, 1octene, 1-nonene, 1-decene, 4-methyl-1-pentene, 4-methyl-1-hexene, 5methyl-1-hexene, 4,4-dimethyl-1-pentene, 4-methyl-1-heptene, 5-methyl-1-heptene, 6-methyl-1-heptene, 4,4-dimethyl-1-hexene, 5,6,6-trimethyl-1-heptene, 5,5-dimethyl-1-octene, 5-methyl-1-nonene and the like; particularly preferred herein is propylene. The concentration of $C_3$-$C_{10}$ olefin monomer units in the final copolymer ranges in general from about 10 to about 70 percent by weight. The copolymers are generally elastomers, although where the ethylene content is relatively high (above about 75 percent), they have some of the properties of plastics and are often designated as "plastomers."

It is to be understood that the term "copolymer of ethylene and a $C_3$-$C_{10}$ alpha olefin" is meant to include such copolymers which additionally include about 0.1-20 wt. percent, preferably 1-15 wt. percent, of a nonconjugated diolefin to add unsaturation to the final product so that it may be conventionally sulfur-cured. Suitable diolefins include 5-methylene-2-norbornene, methyl norbornadiene, isopropenylnorbornene, 5-ethylidene-2-norbornene, dicyclopentadiene, 4,7,8,9-tetrahydroindene, 1,5-cyclooctadiene, and 1,4-hexadiene. In this invention 5-methylene-2-norbornene and 5-ethylidene-2-norbornene are preferred. Most preferred is 5-ethylidene-2-norbornene.

In preparing and using catalysts according to this invention, all steps should be carried out in the absence of moisture, carbon dioxide or other harmful impurities. This end is readily accomplished by blanketing all of the raw materials including the catalyst components, monomers, and inert diluents with an inert gas such as dry nitrogen or argon. Preferably, all materials are purified, e.g., by drying, distillation, etc., prior to their use. The reaction temperature for the formation of the vanadium compound-titanium compound catalyst component is suitably room temperature. This temperature is not critical, however, and either lower temperatures (e.g., 45° F.) or higher temperatures (e.g., 100° F.) may be used, although in selecting a higher temperature, a factor to be considered is that the reaction is exothermic.

The conditions at which the polymerization reaction is carried out can vary over a wide range. Generally, temperatures ranging from −40° to 150° C. can be used; however, temperatures ranging from 0° to 60° C. are preferred. Pressures ranging from 0.0 to 1,000 psig can be employed in the polymerization reaction; however, pressures in the range of from about 15 to 300 psig are more generally used. The reaction times used in the formation of the copolymers depend in general upon the temperatures used. Generally, reaction times ranging from 1 minute to 5 hours can be employed; however, it is more usual to use reaction times ranging from 5 to 60 minutes.

The reaction vessel can be constructed of any material that is inert to the reactants and diluents used, and is capable of withstanding the operating pressures. Reaction vessels made of glass, stainless steel and glass-lined steel are quite satisfactory. Details of the polymerization process have been generally described in the art; see for example, copending application no. 334,938.

The copolymers of this invention are rubbery, or at least contain a substantial amount of amorphous material, and may be cured to useful vulcanizates. Where the copolymer has no unsaturation, i.e., does not contain a diolefin monomer, it may be cured with the use of certain free radical generators such as organic peroxides, e.g., dicumyl peroxide, or selected haloaliphatic compounds, e.g., octachlorocyclopentene. Where the copolymer contains unsaturation, conventional sulfur cures are possible. Generally, the copolymers have a viscosity average molecular weight in the range of 30,000 to 1,000,000 as determined by intrinsic viscosity in decalin solution at 135° C.

Various solvents may be used in the practice of this invention and they include aliphatic, naphthenic, aromatic, and halogenated hydrocarbon solvents, or an excess of the higher alpha olefin such as propylene may be used. Examples of solvents include n-hexane, propane, cyclohexane, toluene, xylenes, tetrachloroethylene, decalin, and chlorobenzenes. Preferably, n-hexane is used.

A variety of oils, carbon blacks, clays and silicas may be used as filler for the rubbers produced by this invention. The carbon blacks which are useful include high, medium or low structure SAF, SRF, HAF, FEF Blacks, and MPC blacks, all of which are commercially available. The amount of carbon black used can be from zero to 300 parts by weight, but preferably zero to 200 parts per 100 parts of elastomer is used. From zero to 250 parts by weight of oil can also be added to obtain the desired balance of physical and processing properties in the final compound.

An unusual feature of this invention is that the copolymer produced with this novel catalyst can be cured to a high tensile strength material when the carbon black filler has a relatively large particle size. Specifically, it has been found that tensile strengths in excess of 900 psi are obtained when the cured polymer contains 150 to 300 parts by weight of a carbon black (having an average particle size in the range of 0.01 to 0.5 microns) and 50 to 150 parts by weight of an extender oil.

An additional feature of this invention is that copolymers (including terpolymers) are produced which have unusually high green strengths. The green strength of a polymer is related to its tensile strength before curing. A high green strength insures a minimum of cracking of the polymer when it is pulled from the mill by an extruder. Additionally, a high green strength facilitates the fabrication of articles, such as molded hose, where the uncured elastomer compound is forced onto a mandrel, by eliminating creasing at high stress points. Furthermore, better dimensional control of extruded profiles is provided by minimization of collapse. Thus, copolymers of relatively high green strength, insofar as they do not crack, crease, or collapse, are more easily and economically processed.

Green strength was measured in psi by the following test. A 4 × 6 inches single cavity mold was preheated and then lubricated on both mold surfaces. Fifty-five grams of the uncured copolymer compound containing: 100 parts of polymer (rubber), 200 parts per 100 parts of rubber (phr) of SRF black, 100 phr of oil, 1 phr of stearic acid, 5 phr of zinc oxide was placed in the mold with its grain lengthwise. The mold was placed in a carver press set at 190° F. The platens were then closed and the load increased in three steps up to 24,000 lbs. within 45 seconds. The mold was held under pressure for an additional 75 seconds after which the heat was turned off and water was circulated through the platens until they cooled down to room temperature. The pressure was then released and the compound removed from the mold. The compound pad was then relaxed for about 20 minutes at 25° C., after which the tensile strength was obtained on a Scott Tester at 20 inches/minute in accordance with ASTM Test No. D-412-66 at 25° C.

Green strengths of at least about 200 psi and higher are desirable and are easily achieved by means of this invention. Preferred are copolymers with a green strength of at least 250 psi.

It has been found that the green strength of copolymers made according to this invention is related to the low but controlled degree of crystallinity of the polymer which is a function of the weight percent of ethylene in the polymer. Thus, copolymers prepared according to this invention and containing at least about 70 wt. percent of ethylene will have a green strength in the desirable range (i.e., about 200 psi or higher). Copolymers containing about 72-75 wt. percent of ethylene will have even higher green strengths (in the range of at least about 250). The green strength continues to rise with the proportion of ethylene in the copolymer, although when more than about 80 wt. percent of ethylene is in the copolymer, other processing characteristics are not optimal.

Copolymers produced with conventional catalyst systems do not show this degree of correlation between ethylene content and green strength.

Copolymers produced with various catalyst systems will exhibit different crystallinity levels for essentially the same composition. Therefore, the preferred ethylene level will depend upon the nature of the catalyst system used. As shown in the examples, the crystallinity should be in excess of about 2 weight percent, to achieve green strength of over about 200 psi.

The invention and its advantages will be better understood by reference to the following examples, where all ethylene compositions were measured by use of the correlation described by H. V. Drushel and F. A. Iddings in Anal. Chem. 35, 28–33 (1963).

EXAMPLE 1

A reaction product of $VOCl_3$ and tetrabutyl titanate was formed specifically as follows: Equal weights of $VOCl_3$ and $Ti(O-Butyl)_4$ were dissolved in n-hexane to make a 1.0 g/100 ml. catalyst solution. This formed a homogeneous solution and was accompanied by a significant heat effect apparently due to the formation of a new catalyst complex. This reaction product was added to the reactor with diethyl aluminum chloride and used to polymerize a mixture of ethylene, propylene and 5-methylene-2-norbornene in a weight ratio of 1/3/0.08. In a control experiment the same monomers in the same ratio were polymerized with a mixture of diethyl aluminum chloride and $VOCl_3$ which was not reacted with a titanium compound. The results are shown in Table I.

TABLE I

COMPARISON OF CATALYST SYSTEMS

| Run | A | B |
|---|---|---|
| ML-212°F. | 33 | 50 |
| Wt. % $C_2^=$ | 59.0 | 60.5 |
| Wt. % Diene (5-methylene-2-norbornene) | 3.4 | 3.3 |
| Catalyst 0.016 moles | $VOCl_3$ | 1/1 $VOCl_3/Ti(OBu)_4$ |
| Cocatalyst 0.093 moles | $Et_2AlCl$ | $Et_2AlCl$ |
| 60 SRF (20' at 320°F.) (1Stearic Acid, -ZnO, 5ZnO, 1-Tuads[1], 0.5-Captax[2], 1Sulfur) | | |
| Tensile, psi[5] | 2700 | 2560 |
| Elongation, % | 520 | 460 |
| 200% Modulus | 850 | 1050 |
| Shore A Hardness | 71 | 71 |
| Scorch[3]/Plasticity[4] | 10/50 | 9/77 |
| Garvey Extrusion | | |
| Inches/Minute | 49 | 33 |
| Rating | 3443 | 2343 |
| 200 FEF/100 Oil (20' at 320°F.) (1-Stearic Acid, 5-ZnO, 1.5-Tuads[1], 0.5-Captax[2], 1.5-sulfur) | | |
| Tensile, psi[5] | 750 | 1260 |
| Elongation, % | 130 | 210 |
| 100% Modulus | 680 | 700 |
| Shore A Hardness | 84 | 80 |
| Scorch[3]/Plasticity[4] | 8/67 | 8/68 |
| Garvey Extrusion | | |
| Inches/Minute | 88 | 75 |
| Rating | 4444 | 4444 |

[1]Tetramethylthiuram disulfide
[2]Mercaptobenzothiazole
[3]MS-270, minutes to 3 point rise
[4]ML-212 (1+8')
[5]In accordance with ASTM Test No. D-412-66

EXAMPLE 2

Example 1 was repeated with the use of different catalyst compositions of this invention. The results are shown in Table II below:

TABLE II

COMPARISON OF CATALYST SYSTEMS

| Run | C[1] | D[2] |
|---|---|---|
| ML-212 | 50 | 60 |
| Wt. % $C_2^=$ | 53.2 | 65.0 |
| Wt. % Diene | 2.9 | 2.9 |
| Catalyst 0.016; 0.018 moles | $VOCl_3/Ti(O-nBu)_4$ | $VOCl_3/Ti(O-iPr)_4$ |
| Cocatalyst 0.107; 0.085 moles | $Et_3Al_2Cl_3$ | $Et_2AlCl$ |
| 200 FEF/100 Oil (20' at 320°F.) (1-Stearic Acid, 5-ZnO, 1.5-Sulfur) | | |
| Tensile, psi | 950 | 1120 |
| Elongation, % | 190 | 240 |
| 100% Modulus | 620 | 600 |
| Shore A Hardness | 79 | 78 |
| Scorch/Plasticity | 7/84 | 14.5/72 |
| Garvey Extrusion | | |
| Inches/Minute | 70.0 | 78.3 |
| Rating | 4444 | 4444 |

[1]Contained 1.5 phr of tetramethylthiuram disulfide in the curing recipe, 0.5 Captax
[2]Contained 1.5 phr of Monex (tetramethylthiuram monosulfide) in the curing recipe, 0.5 Altax (mercaptobenzothiazole sulfide)

EXAMPLE 3

The following data were obtained to show the differences between terpolymers produced with the catalyst of this invention as compared with a catalyst of the prior art (i.e., $VOCl_3$ with diethyl aluminum chloride). The differences relate to molecular weight distribution, ethylene distribution, and distribution of the diene in the terpolymer. The terpolymers which are analyzed in the data below are those which were formed in Example 1. Table III represents a control and Table IV relates to the terpolymer of this invention. The viscosity average molecular weight was determined by intrinsic viscosity in decalin at 135° C.

TABLE III

$VOCl_3/Et_2AlCl$ TERPOLYMER(CONTROL)

| Cumulative % | Mole % Ethylene | Wt. % Diene | M.W. × $10^{-3}$ |
|---|---|---|---|
| 11.2 | 53.8 | 3.04 | 8 |
| 15.3 | 56.7 | 2.64 | 15 |
| 19.4 | | | 26 |
| 22.6 | 61.5 | 3.14 | |
| 26.4 | | | 33 |
| 30.7 | 66.3 | 3.04 | |
| 35.2 | | | 35 |
| 40.2 | 71.3 | 3.41 | |
| 43.1 | | | 49 |
| 46.1 | 72.2 | 3.61 | |
| 49.1 | | | 56 |
| 52.3 | 73.7 | 3.61 | |
| 55.5 | | | 66 |

| 58.5 | 74.2 | 3.84 | 73 |
| 64.9 | | | 79 |
| 68.0 | 73.3 | 3.74 | |
| 71.2 | | | 95 |
| 74.4 | 74.0 | 3.77 | |
| 77.9 | | | 117 |
| 81.1 | 73.7 | 3.86 | |
| 84.0 | | | 127 |
| 86.7 | 75.3 | 4.19 | |
| 88.9 | | | 167 |
| 90.3 | 78.7 | 4.82 | |
| 92.4 | | | 251 |
| 93.9 | | 5.28 | |
| 96.4 | 78.6 | 5.13 | 313 |
| 99.5 | 80.0 | 3.88 | 382 |

TABLE IV

$VOCl_3$-$Ti(O-Bu)_4$/$Et_2AlCl$ TERPOLYMER

| Cumulative % | Mole % Ethylene | Wt. % Diene | M.W. × 10⁻³ |
|---|---|---|---|
| 8.4 | 65.6 | 3.74 | 8 |
| 13.3 | 68.3 | 3.86 | 28 |
| 17.1 | | | 28 |
| 20.2 | 70.1 | 4.23 | |
| 23.8 | | | 50 |
| 28.5 | 70.0 | 4.16 | |
| 31.1 | 69.4 | 3.97 | |
| 34.0 | | | 97 |
| 37.1 | 69.4 | 3.85 | |
| 40.5 | | | 103 |
| 44.0 | 70.8 | 4.03 | |
| 47.6 | | | 122 |
| 51.5 | 71.0 | 3.85 | |
| 54.7 | | | 160 |
| 58.3 | 72.9 | 3.92 | |
| 61.9 | | | 187 |
| 65.4 | 72.9 | 3.96 | |
| 68.9 | | | 220 |
| 72.2 | 72.7 | 3.98 | |
| 75.4 | | | 255 |
| 78.8 | 73.0 | 3.94 | |
| 82.0 | | | 295 |
| 84.7 | 73.2 | 3.67 | |
| 86.8 | | | 378 |
| 88.4 | 73.8 | 3.64 | |
| 89.8 | | | 485 |
| 91.5 | 72.9 | 3.28 | |
| 93.3 | 73.8 | 3.06 | 710 |
| 94.8 | 73.8 | 2.95 | 810 |
| 97.7 | 74.6 | 2.83 | 825 |
| 98.1 | | | 685 |

EXAMPLE 4

To show that $VCl_4$ is not useful in this invention, the following experiment was performed. $VCl_4$ and $Ti(O-Butyl)_4$ were mixed in n-hexane solvent and a black precipitate formed. The reaction product, in combination with aluminum diethyl chloride, when contacted with the monomers of Example 1, had no catalytic activity and no polymer was formed.

EXAMPLE 5

To show that copolymers of high green strength can be produced with the catalyst of this invention, the following experiment was performed. A reaction product of $VOCl_3$ and tetrabutyl titanate was prepared as in Example 1. This reaction product was added to the reactor together with 0.096 moles of aluminum diethyl chloride and used to polymerize a mixture of ethylene, propylene, and 5-methylene-2-norbornene (MNB) in a weight ratio of 1/3/0.08. The results are shown in Table V.

TABLE V

| Run No. | 1 | 2 | 3 |
|---|---|---|---|
| Temperature, °C. | 35 | 26.5 | 15 |
| Catalyst Conc., lb./100 lb. Hexane | 0.0065 | 0.006 | 0.007 |
| Ethylene, Wt. % | 74.6 | 75.3 | 72.9 |
| MNB, Wt. % | 2.7 | 2.7 | 2.6 |
| 200 FEF/100 Oil(20' at 320°F.)(1-Stearic Acid,5-ZnO, 1.5-Sulfur) | | | |
| Tensile, psi(1) | 1665 | 1890 | 1800 |
| Elongation, % | 180 | 215 | 230 |
| Extrusion Rate, Inches/Minute | 95 | 85 | 75 |
| Mooney Scorch at 270°F., $T_3$ | 12.8 | 10.9 | 11.3 |
| Mooney Plasticity at 212°F. | 92 | 106 | 106 |
| Green Strength, psi | 320 | 370 | 270 |

¹Compounded with, in addition to above, 1.5 phr tetramethyl thiuram disulfide and 0.5 phr mercaptobenzothiazole.

As can be seen from the last line of the table above, very high green strengths are achieved with this invention.

EXAMPLE 6

Example 5 was repeated with the exception that 5-ethylidene-2-norbornene was substituted for the methylene norbornene. Equally good green strengths were obtained and the resulting copolymer had an additionally desirable property in that there was less interaction with carbon black during processing.

EXAMPLES 7–11

A series of five catalyst compositions were prepared and used in the polymerization of a mixture of ethylene, propylene and 5-methylene-2-norbornene (MNB). The polymers produced were compounded, as follows, and tensile strengths determined in a standard manner in accordance with ASTM Test No. D-412-66.

| Component | Parts |
|---|---|
| Polymer | 100 |
| FEF Black | 100 |
| Flexon 886 (oil) | 120 |
| Stearic acid | 1 |
| ZnO | 5 |
| Tetramethyl thiruam disulfide | 3 |
| Mercapto benzothiazole | 0.5 |
| Sulfur | 1.5 |

The compounded rubber from each preparation were separately mixed in a Banbury Mill for 5 minutes at 240°F. Tensile pads were prepared and cured for 20 minutes at 320° F.

The series of comparative runs was made to demonstrate the inapplicability, to the present invention, of catalyst systems commonly used in preparing crystalline, thermoplastic polymers, of ethylene and $C_3$-$C_{10}$ alpha olefins. In particular, the teachings of U.S. Pat. No. 3,173,901 were used as a basis of the comparative catalyst preparations. The results are shown in Table VI.

The catalyst compositions were prepared as below:

7. (in accordance with the present invention) the first component of the catalyst system was made by mixing 2.0 moles of $VOCl_3$ and 1.0 mole of tetrabutyl titanate. Upon mixing the reactants (which were originally at room temperature), substantial heat of reaction was observed immediately and the temperature of the reaction mixture increased. The reaction product so formed was used as catalyst together with 12.9 moles of diethyl aluminum chloride.

8. This composition was prepared by mixing 2.0 moles of $VOCl_3$ and 1.0 mole of $TiCl_4$. Upon mixing, the mixture showed no evidence of heat of reaction. There was then added 12.9 moles of aluminum triethyl.

9. A catalyst mixture was prepared as in Example 8 with the addition of 2 weight percent, based on total catalyst composition of $SiCl_4$.

10. The catalyst composition of U.S. Pat. No. 3,173,901 was prepared according to Example 1 of the patent.

11. The catalyst composition of U.S. Pat. No. 3,173,901 was prepared according to Example 2 of the patent.

In each of the above Examples 7–11, the catalyst was fed to a polymerization reactor as a solution in n-hexane in amounts sufficient to make a solution containing 0.333 grams of total catalyst per 100 ml. of hexane solution. There was admitted to each reaction vessel (per 100 parts of n-hexane diluent) 3.2 parts of ethylene, 10.0 parts of propylene, and 0.20 parts of 5-methylene-2-norbornene (MNB). 0.0149 parts of catalyst plus 0.0333 parts of the alkyl aluminum also were admitted to the reactor. During the reaction, the mixture was maintained at a temperature of 26.5° C.; with vigorous agitation being provided. The nominal residence time in the reaction was 13.3 minutes; and at the end of this period, the reaction was terminated by quenching with 0.5 parts of isopropyl alcohol. After the reaction had been terminated by addition of the alcohol, the reaction mixture was heated to 100° C. to flash off the n-hexane diluent. The residual polymer crumb was hot milled to dryness and the products so obtained were subjected to analysis.

The polymer products, from the above preparations, when compounded and cured as indicated, exhibited the tensile strengths shown in Table VI.

TABLE VI

| Example | Tensile Strength (psi) |
|---|---|
| 7 | 2010 |
| 8 | 1030 |
| 9 | 790 |
| 10 | 1020 |
| 11 | 1050 |

It is apparent that the tensile strength of the product prepared by the present process, 2,010 psi, is substantially greater than the tensile strengths of the polymers produced by other, known catalyst systems of mixed transition metal compounds.

In addition to the tensile properties of the polymers produced above, tests were conducted to determine the heat of melting of the polymers. This was done by differential thermal analysis (DTA) using a DTA calorimeter. The test was conducted at a rate of 10° C. per minute.

Polymer produced in Example 7 had a heat of melting ($\Delta H$) of 0.0 calories/gram, while the polymers produced with the catalysts of Examples 8–11 exhibit $\Delta H$'s in excess of 3.0 calories/gram. The Example 9 product had a $\Delta H$ of 3.8 cal./gram. The distinct areas of melting shown in these tests, exhibited by the polymers of Examples 8–11 are attributable to long sequences of ethylene.

EXAMPLE 12

To show that the green strength of the copolymer is not appreciably affected by the catalyst concentration, or the polymerization temperature, the procedure of Example 5 was repeated except that the ethylene and propylene feed rates were varied as shown. The MNB feed rate was the same as in Example 5.

Table VII shows results achieved with a polymerization temperature of 95° F., and Table VIII shows results achieved with a polymerization temperature of 80° F.

TABLE VII (95°F.)

| Run No. | $C_2H_4$ lb./100 lb. Hexane | $C_3H_6$ lb./100 lb. Hexane | Catalyst feed lb./100 lb. Hexane | Wt. % $C_2$= in polymer | Green strength psi |
|---|---|---|---|---|---|
| 1 | 3.0 | 5.5 | 0.0055 | 72.0 | 270 |
| 2 | 3.0 | 6.3 | " | 69.7 | 130 |
| 3 | 3.0 | 4.7 | " | 72.3 | 230 |
| 4 | 2.8 | 3.8 | 0.0065 | 72.7 | 305 |
| 5 | 2.8 | 3.2 | " | 76.2 | 345 |
| 6 | 2.8 | 2.7 | " | 78.0 | 390 |
| 7 | 3.0 | 4.0 | 0.0085 | 70.5 | 180 |
| 8 | 3.0 | 3.4 | " | 71.6 | 270 |
| 9 | 3.0 | 2.8 | " | 77.0 | 380 |
| 10 | 2.8 | 3.6 | 0.007 | 74.4 | 300 |

TABLE VIII (80°F.)

| Run No. | $C_2H_4$ lb./100 lb. Hexane | $C_3H_6$ lb./100 lb. Hexane | Catalyst feed lb./100 lb. Hexane | Wt. % $C_2$= in polymer | Green strength psi |
|---|---|---|---|---|---|
| 11 | 3.0 | 4.3 | 0.0055 | 74.5 | 395 |
| 12 | 3.0 | 3.4 | " | 78.0 | 525 |
| 13 | 3.0 | 4.9 | " | 73.6 | 300 |
| 14 | 3.0 | 5.5 | 0.0065 | 68.0 | 70 |
| 15 | 3.0 | 4.5 | " | 69.9 | 140 |
| 16 | 3.0 | 3.6 | " | 73.8 | 345 |
| 17 | 3.0 | 3.5 | 0.0085 | 71.2 | 180 |
| 18 | 3.0 | 3.0 | " | 72.5 | 270 |
| 19 | 3.0 | 2.5 | " | 75.8 | 420 |
| 20 | 3.2 | 4.6 | 0.0060 | 75.3 | 400 |

EXAMPLE 13

Commercially available elastomeric copolymers produced with conventional catalysts were tested for green strength when compounded with 200 parts of black and 100 parts of oil. As can be seen from the table below, these copolymers did not have high green strengths even when their ethylene content was high.

TABLE IX

| Polymer | Wt. % $C_2H_4$ | Green Strength psi | Wt. % Crystallinity[a] |
|---|---|---|---|
| This invention[b] | 70–78.0 | 200–>500 | 2–15 |
| Royalene 302[c] | 74.4 | 173 | 1.2 |
| Nordel 1145[d] | 74.0 | 59 | <1.0 |

[a] As determined from calorimeter heats of fusion.
[b] See Tables VII and VIII.
[c] A commercially available terpolymer of ethylene, propylene and about 1 mole percent of a third monomer (believed to be dicyclopentadiene).
[d] A commercially available terpolymer of ethylene, propylene and about 1 mole percent of a third monomer (believed to be 1,4-hexadiene).

This invention has been described in connection with certain specific embodiments thereof; however, it should be understood that these are by way of example rather than by way of limitation, and it is not intended that the invention be restricted thereby.

What is claimed is:

1. A process for polymerizing a mixture comprising ethylene and a $C_3$ to $C_{10}$ alpha olefin which comprises contacting said mixture with a catalyst composition comprising:

a. an essentially one molar equivalent of an aluminum alkyl compound of the formula $R_mAlX_n$ wherein R is independently selected from the group consisting of $C_1$-$C_{12}$ monovalent hydrocarbon radicals, X is a halogen having an atomic number equal to or greater than 17, m is an integer from 1 to 3 and the sum of m and n is equal to 3; in combination with b. 0.05 to 0.08 molar equivalents of a polymerization catalyst component consisting essentially of the reaction product formed by mixing:
   i. a vanadium oxyhalide wherein the halogen has an atomic number equal to or greater than 17; with
   ii. a titanium compound having the formula $Ti(OR)_4$ wherein R is a $C_1$-$C_{12}$ alkyl radical and the mole ratio of said vanadium oxyhalide to said titanium compound is in the range of 0.05 to 10 moles of vanadium oxyhalide per mole of titanium compound.

2. The process of claim 1 wherein said titanium compound is tetrabutyl titanate.

3. The process of claim 1 wherein said aluminum alkyl compound is diethyl aluminum chloride.

4. The process of claim 1 wherein said vanadium oxyhalide is $VOCl_3$.

5. The process of claim 1 wherein said $C_3$ to $C_{10}$ alpha olefin is propylene.

6. The process of claim 1 wherein the mixture being polymerized additionally contains a nonconjugated diene.

7. The process of claim 6 wherein the nonconjugated diene is 5-ethylidene-2-norbornene.

* * * * *